United States Patent
Zhou et al.

(10) Patent No.: US 9,644,491 B2
(45) Date of Patent: May 9, 2017

(54) SINGLE BOLTING FLANGE ARRANGEMENT FOR VARIABLE GUIDE VANE CONNECTION

(71) Applicant: PRATT & WHITNEY CANADA CORP., Longueuil (CA)

(72) Inventors: Yongsheng Zhou, Mississauga (CA); Tibor Urac, Mississauga (CA); Esther Leung, Markham (CA); Grigory Rukin, Vaughan (CA); Noushin Bahramshahi, Thornhill (CA); Yuhua Wu, Brampton (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 392 days.

(21) Appl. No.: 14/304,134

(22) Filed: Jun. 13, 2014

(65) Prior Publication Data

US 2015/0361820 A1  Dec. 17, 2015

(51) Int. Cl.

| F01D 17/16 | (2006.01) |
|---|---|
| F02C 9/20 | (2006.01) |
| F04D 29/46 | (2006.01) |
| F04D 29/56 | (2006.01) |

(52) U.S. Cl.
CPC .......... *F01D 17/16* (2013.01); *F01D 17/165* (2013.01); *F02C 9/20* (2013.01); *F04D 29/462* (2013.01); *F04D 29/563* (2013.01); *F05D 2260/50* (2013.01)

(58) Field of Classification Search
CPC ......... F01D 17/165; F01D 17/162; F02C 9/20
USPC ........................................................ 403/302
See application file for complete search history.

(56) References Cited

U.S. PATENT DOCUMENTS

| 3,685,920 | A | | 8/1972 | Burge |
|---|---|---|---|---|
| 3,982,390 | A | * | 9/1976 | Bell, III .................... F02C 9/56 60/39.5 |
| 4,035,101 | A | * | 7/1977 | Glenn ................... F01D 17/162 415/160 |
| 4,049,360 | A | | 9/1977 | Snell |
| 4,430,043 | A | | 2/1984 | Knight et al. |
| 4,773,821 | A | | 9/1988 | Gonthier et al. |
| 4,826,399 | A | | 5/1989 | Perez |
| 5,061,152 | A | | 10/1991 | Marey |
| 5,096,374 | A | | 3/1992 | Sakai et al. |
| 5,492,446 | A | | 2/1996 | Hawkins et al. |
| 6,699,010 | B2 | | 3/2004 | Jinnai |

(Continued)

FOREIGN PATENT DOCUMENTS

FR  2904669 B1 *  5/2012  ............. F01D 17/16

OTHER PUBLICATIONS

Hinds, Paul. "Joinery Terms" accessed from http://www.hobbithouseinc.com/personal/woodpics/_joineryterms.htm on Aug. 22, 2016 available as of Jun. 4, 2013 via archive.org.*

*Primary Examiner* — Nathaniel Wiehe
*Assistant Examiner* — Topaz L Elliott
(74) *Attorney, Agent, or Firm* — Norton Rose Fulbright Canada

(57) ABSTRACT

A single bolting flange arrangement for variable inlet guide vane (VIGV) connection includes a connection arm connected to a stem of the VIGV to rotate the VIGV. The connection arm is driven by a drive pin received in a slot of the connection arm. The connection arm has a bolting flange and the stem of the VIGV is fastened to one side of the single bolting flange by a bolt/nut assembly.

16 Claims, 6 Drawing Sheets

(56) References Cited

U.S. PATENT DOCUMENTS

| | | |
|---|---|---|
| 7,004,723 B2 | 2/2006 | Raulin et al. |
| 7,011,494 B2 | 3/2006 | Kies et al. |
| 7,140,838 B2 | 11/2006 | Raulin et al. |
| 7,300,245 B2 | 11/2007 | Bouru |
| 7,938,620 B2 | 5/2011 | Bouru |
| RE42,523 E | 7/2011 | Bouru |
| 8,215,902 B2 | 7/2012 | Major et al. |
| 8,226,357 B2 | 7/2012 | Bouru et al. |
| 9,200,640 B2 * | 12/2015 | Patil .................... F04D 27/0246 |

* cited by examiner

US 9,644,491 B2

SINGLE BOLTING FLANGE ARRANGEMENT FOR VARIABLE GUIDE VANE CONNECTION

TECHNICAL FIELD

The application relates generally to gas turbine engines and, more particularly, to an apparatus for actuating a variable guide vane for such engines.

BACKGROUND OF THE ART

Gas turbine engines sometimes have a compressor section having variable guide vanes (VGVs) disposed in an inlet section of an airflow duct of the compressor section. The guide vanes are adjustable in an angular orientation in order to control the airflow being directed through the airflow duct. A rotary actuator ring positioned outside the airflow duct is conventionally used to actuate adjustment of the angular orientation of the VGVs. Various actuating apparatus have been created for connection between the rotary actuator ring and the VGVs, which however are generally for connection to an axial VGV system with guide vanes positioned substantially perpendicular to the center line of the engine, to be disposed in an axial inlet section of the airflow duct in the compressor section.

There is a need to develop VGV connection arrangements for a radial VGV system in which guide vanes are positioned parallel to the center line of the engine and the guide vanes are disposed in a radial inlet section of the airflow duct in the compressor section, for example, in a turboshaft engine with a radial inlet.

SUMMARY

In one aspect, there is provided a variable guide vane (VGV) apparatus comprising: a plurality of variable guide vanes (VGVs), each vane having a rotational axis and being rotatable in an adjustable angular orientation about the rotational axis of the vane; a unison ring defining a central axis and including a plurality of drive pins affixed to the unison ring, the drive pins with the unison ring being adjustable in an angular orientation about the central axis; a plurality of arms each including a base, a pair of parallel forks extending away from the base in a first direction and a bolting flange extending away from the base in a second direction opposite to the first direction, the pair of forks defining a slot therebetween, one of said drive pins being slidably received in the slot, the bolting flange defining a hole extending therethrough; a plurality of stems connected to the respective VGVs and rotatable about the rotational axis of the respective vanes, each stem having an end section defining parallel side surfaces facing away from each other, each stem defining a hole extending from one side surface to the other side surface; and a plurality of bolts moveably securing the stems to the respective arms, each bolt extending in a tangential direction with respect to the central axis through the hole of one of the bolting flanges and through the hole of one of the stems, wherein one of the side surface of each stem is in contact with the bolting flange of a corresponding arm while the other side surface of each stem is free of contact with said corresponding arm.

In another aspect, there is provided a gas turbine engine comprising: a compressor section; a combustion section; a turbine section; and a variable guide vane (VGV) apparatus mounted to the compressor section and having a plurality of variable guide vanes (VGVs), each vane having a rotational axis and being rotatable about the rotational axis, the apparatus further including: a unison ring disposed around an engine central axis and including a plurality of drive pins affixed to a side of the unison ring and extending axially with respect to the central axis, the unison ring being adjustable in a circumferential direction with respect to the central axis; a plurality of arms each including a base, a pair of parallel forks extending radially outwardly from the base and a bolting flange extending radially and inwardly with respect to the central axis, the forks defining a slot therebetween, one of said axial drive pins being slidably received in the slot, the bolting flange defining a hole extending therethrough; a plurality of stems connected to the respective VGVs and supported in the engine to be rotatable about the respective rotational axes of the VGVs, each stem having an end section defining parallel side surfaces facing away one from the other, and each stem defining a hole extending from one side surface to the other side surface; and a plurality of bolts moveably securing the stems to the respective arms, each bolt extending in a tangential direction with respect to the central axis through the hole of one of the bolting flanges and through the hole of one of the stems, wherein one of the side surface of each stem is in contact with the bolting flange of a corresponding arm while the other side surface of each stem is free of contact with said corresponding arm.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
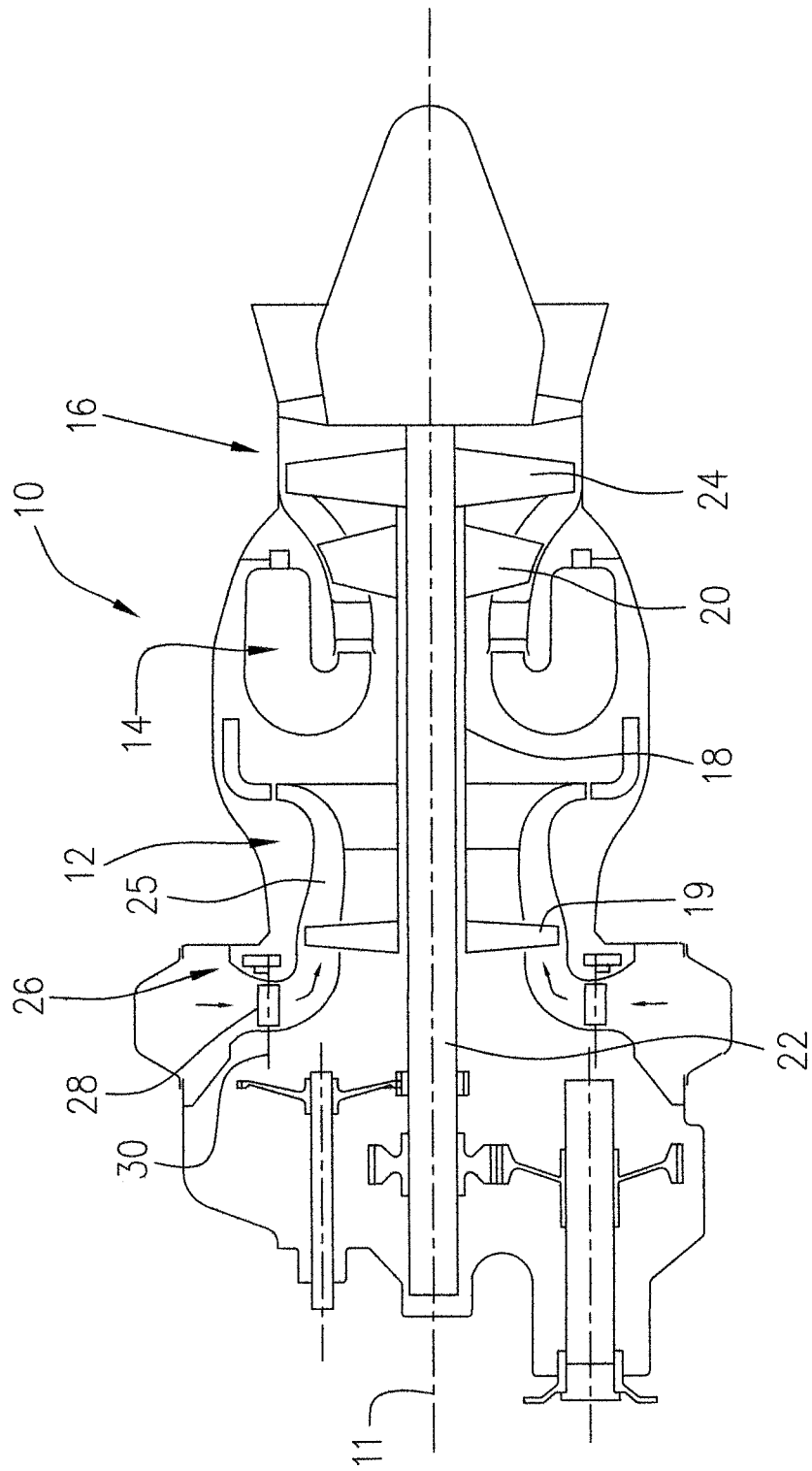
FIG. 1 is a schematic side cross-sectional view of a gas turbine engine having variable inlet guide vanes (VIGVs)
Figure 2:
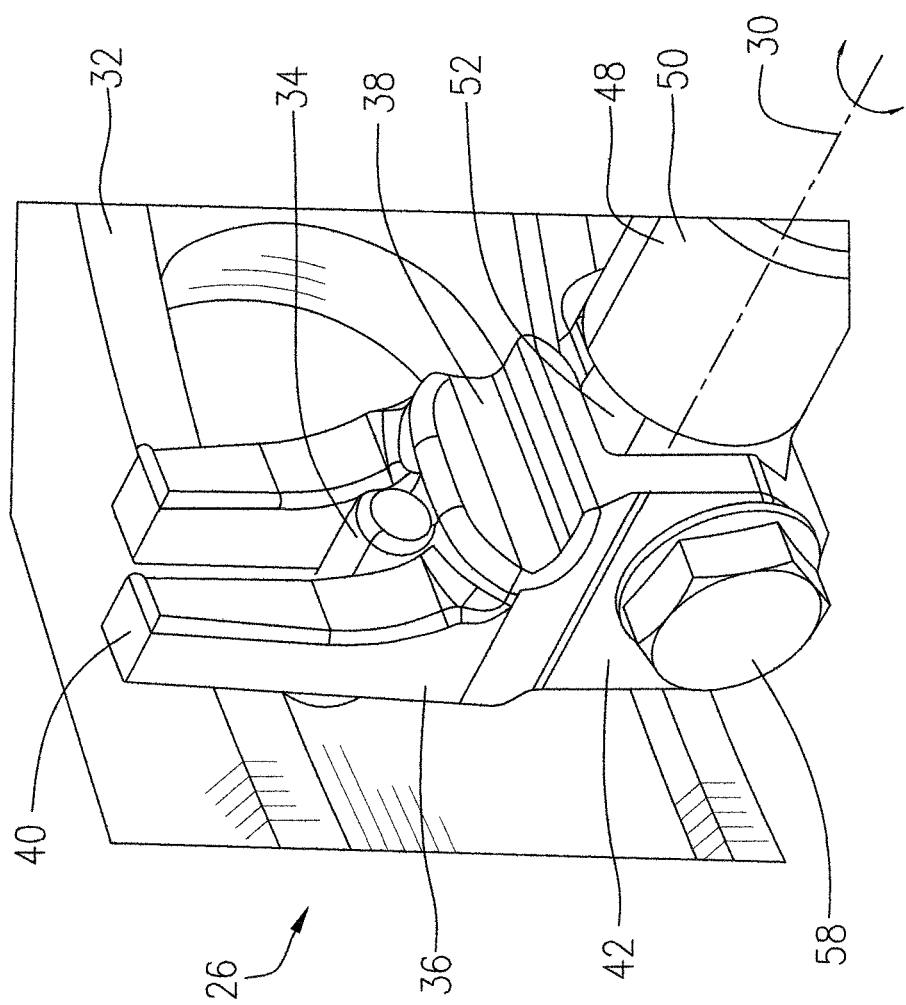
FIG. 2 is a perspective view of an apparatus for actuating the VIGVs of FIG. 1, according to one embodiment, showing a connection arm having one bolting flange at one side thereof connected to a stem of a VIGV.

FIG. 1 illustrates an example of a gas turbine engine. In this example, the turbine engine 10 is a turboshaft engine generally comprising in serial flow communication a compressor section 12 for pressurizing air, a combustor 14 in which the pressurized air is mixed with fuel and ignited for generating an annular stream of hot combustion gases, and a turbine section 16 for extracting energy from the combustion gases.

It should be noted that the terms "axial", "radial" and "circumferential" are used with respect to a central axis 11 of the engine 10.

The turbine engine 10 in this example can be seen to include a high pressure spool assembly 18 including a multistage compressor 19 and a high pressure turbine stage 20, and a low pressure spool assembly 22 including a low pressure turbine stage 24. The low pressure spool assembly 22 is connected to a power shaft (not numbered) via a gear arrangement. The high pressure spool assembly 18 can be referred to herein as a compressor spool, given that it contains at least one compressor stage, and the low pressure spool assembly 22 can be referred to herein as a power spool.

In this example, the compressor section 12 defines an annular airflow duct 25 having a radial inlet section (not numbered) to direct an airflow radially inwardly into the annular airflow duct 25 of the compressor section 12, as indicated by the arrows. A variable guide vane (VGV) apparatus 26 is mounted to the compressor section 12 and has a plurality of variable inlet guide vanes 28 (VIGVs) which are positioned and rotatably supported within the radial inlet section of the airflow duct 25. The VIGV's 28 are each rotatable about a rotational axis 30 thereof, which is substantially parallel to the central axis 11 of the engine. The angular orientation of the VIGVs about the respective rotational axis 30 is adjustable such that the airflow entering the radial inlet section of the airflow duct 25 as indicated by the arrows, is controlled by the VIGVs 28. The VIGVs 28 are connected to and the angular orientation thereof is actuated by other components of the apparatus 26 which are positioned outside of the radial inlet section of the airflow duct 25.

Referring to FIGS. 1-4, the apparatus 26 according to one embodiment may further include a unison ring 32 defining a central axis thereof substantially superposed with the central axis 11 of the engine 10. The unison ring 32 is supported in the engine 10, for example by a support structure affixed to a casing forming the annular air duct 25 in order to allow the unison ring 32 to be adjustable in a circumferential direction with respect to the central axis 11 of the engine. The unison ring 32 may be disposed outside of the airflow duct 25, for example behind the radial inlet section of the annular air duct 25, and may have a plurality of drive pins 34 corresponding to the respective VIGVs 28. Each of the drive pins 34 may be affixed to a front side (facing the VIGVs 28) of the unison ring 32, and may extend substantially axially with respect to the central axis 11 of the engine 10, from the front side of the unison ring 32 towards the VIGVs 28. Therefore, the drive pins 34 together with the unison ring 32 are adjustable in an angular orientation about the central axis 11.

Figure 4:
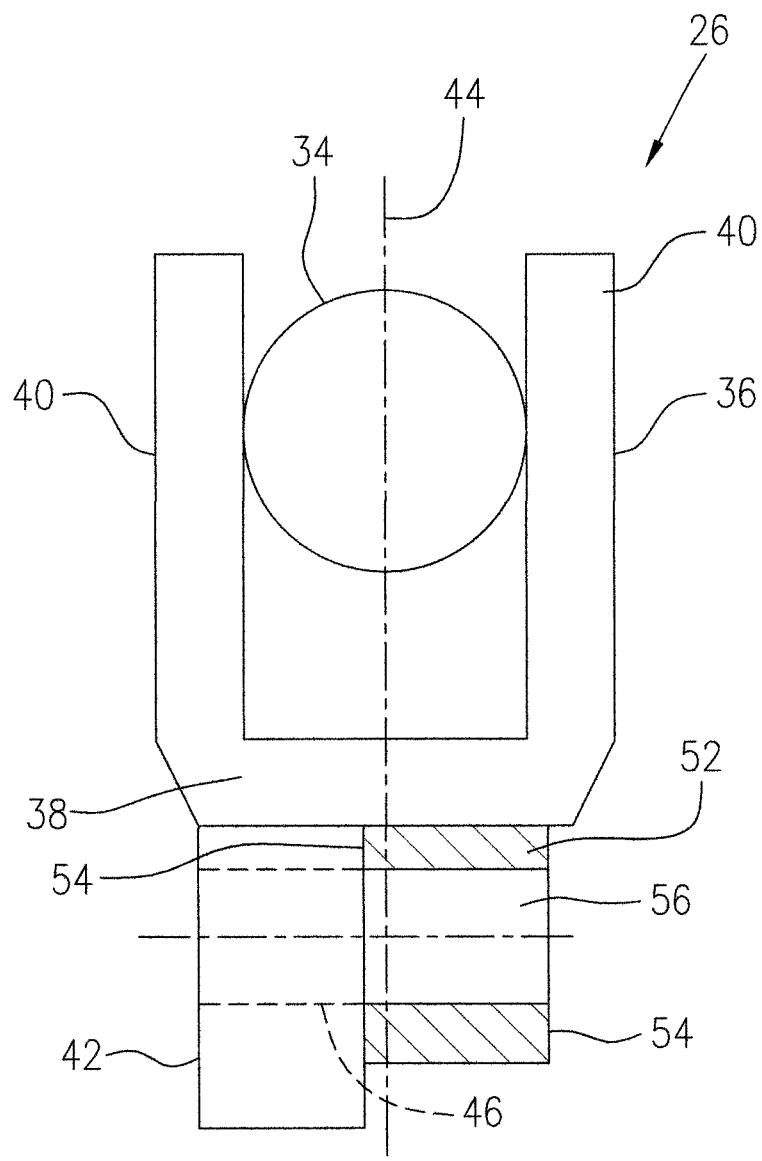
FIG. 4 is a front elevational view of the connection arm according to another embodiment, connected to a stem of the VIGVs of FIG. 1.
Figure 7:
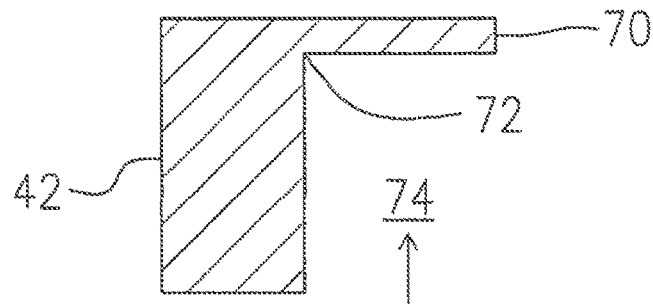
FIG. 7 is a cross-sectional view of the connection arm, taken along line 7-7 of FIG. 6.
Figure 6:
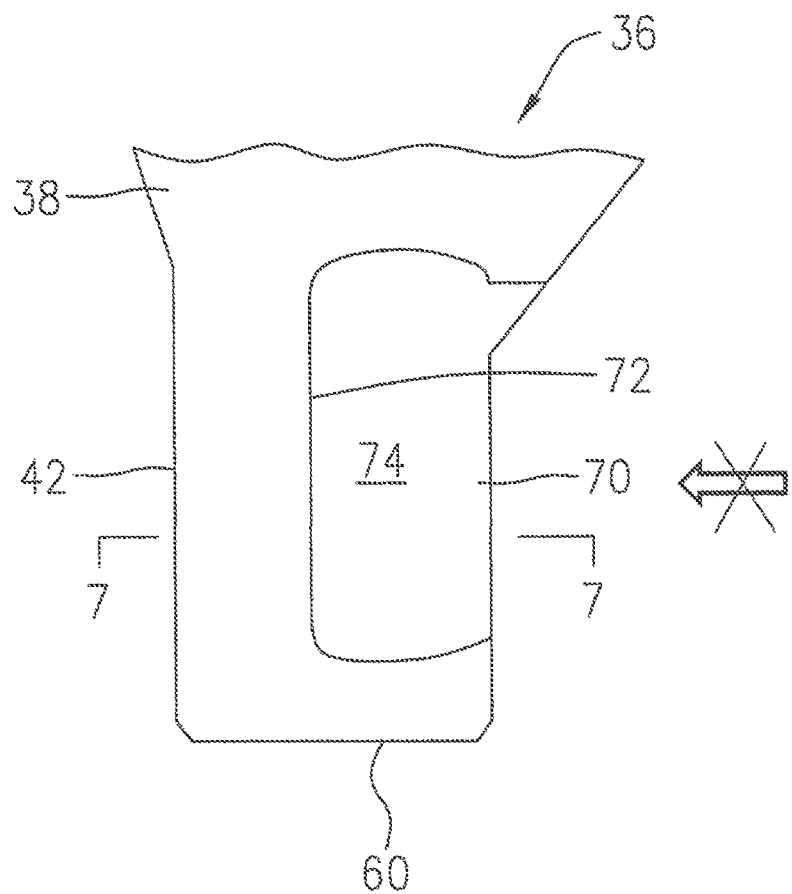
FIG. 6 is a partial and front elevational view of the connection arm of FIG. 5, without being connected to a stem of a VIGV.

According to this embodiment, a connection arm 36 may be provided, which includes a base 38, a pair of forks 40 extending in a parallel relationship and radially outwardly from the base 38, and a bolting flange 42 extending radially inwardly from the base 38 with respect to the central axis 11. The forks 40 and the base 38 may form a U-shaped profile and the bolting flange 42 may be disposed offset from a central axis 44 of the U-shaped profile. The bolting flange 42 may have a thickness greater than the thickness of the respective forks 40. The forks 40 in combination may define a slot therebetween into which one of the axial drive pins 34 may be slidably received. The bolting flange 42 may define a hole 46 extending therethrough in a direction for example, substantially tangential to the central axis 11 of the engine 10 (normal to the central axis 44 of the U-shaped profile of the forks 40/base 38 configuration as shown in FIG. 4).

The apparatus 26 may further include a stem 48 connected to or integrated with each of the VIGVs 28, and being disposed axially with respect to the central axis 11 of the engine 10. For example, the stem 48 may have a cylindrical section 50 rotatably supported in the engine to thereby define the rotational axis 30 of the respective VIGV 28. The stem 48 according to one embodiment may include an end section 52 defining parallel opposed side surfaces 54 facing away one from the other. The end section 52 may further include a hole 56 extending therethrough between the opposed side surfaces 54. The stem 48 may be axially disposed such that one of the side surfaces 54 is placed against one side of the bolting flange 42 with the hole 56 aligned with the hole 46 of the bolting flange 42 to receive a bolt 58 extending therethrough in a tangential direction with respect to the central axis 11. The bolt 58 may be engaged with a nut (not numbered) to removably secure the end section 52 of the stem 48 to the connection arm 36. It should be noted that while one of the opposed side surfaces 54 is placed against the bolting flange 42, the other side surface 54 may be in contact with the bolt assembly (an enlarged bolt head, nut or washers) but is free of contact with any part of the connection arm 36.

When the unison ring 32 is circumferentially adjusted about the central axis 11 of the engine 10, each of the drive pins 34 which is affixed on the unison ring 32, moves together with the unison ring 32 in the circumferential direction to drive one of the connection arms 36 (which is connected with the stem 48) to rotate together with the stem 48 about the respective rotational axis 30 of the VIGVs 28, resulting in adjustment of the angular orientation of the respective VIGVs 28 in order to control the airflow entering the radial inlet section of the annular air duct 25. The drive pin 34 is allowed to slide along the slot defined between the two drive forks 40 when the drive pin 34 drives the connection arm 36 in rotation about the rotational axis 30, because the circumferential movement of the drive pin 34 about the central axis 11 of the engine 10 has a rotation radius much larger than the rotation radius of the connection arm 36 about the respective rotational axis 30 of the VIGVs 28.

Referring to FIGS. 1-3 and 5-7, the connection arm 36 according to another embodiment may further include a support member 60 affixed to and extending from a radial end (not numbered) of the bolting flange 42 and may be spaced apart from the base 38 of the connection arm 36. The base 38 and support member 60 of each connection arm 36 therefore provide a positioning and retaining function to receive the end section 52 to be retained radially therebetween when one of the side surfaces 54 of the end section 52 of the stem 48 is placed against one side of the bolting flange 42 during an assembly procedure of the apparatus 26. Optionally, the respective base 38 and support member 60 may have curved surfaces such as concave surfaces 62 and 64. The end section 52 of the stem 48 may define a radially-outer surface 66 and a radially-inner surface 68 in a curved profile such as a convex profile which may be at least partially in contact with the concave surfaces 62, 64 of the respective base 38 and support member 60 when the end section 52 of the stem 48 is connected to the bolting flange 42 of the connection arm 36. The curved profiles of the respective connection arm 36 and the end section 52 of the stem 48 therefore provide an interlock function to further facilitate the positioning and retaining of the end section 52 of the stem 48 during an assembly procedure of the apparatus 26 without the need of manually holding the connection arm 36 in place.

Figure 5:
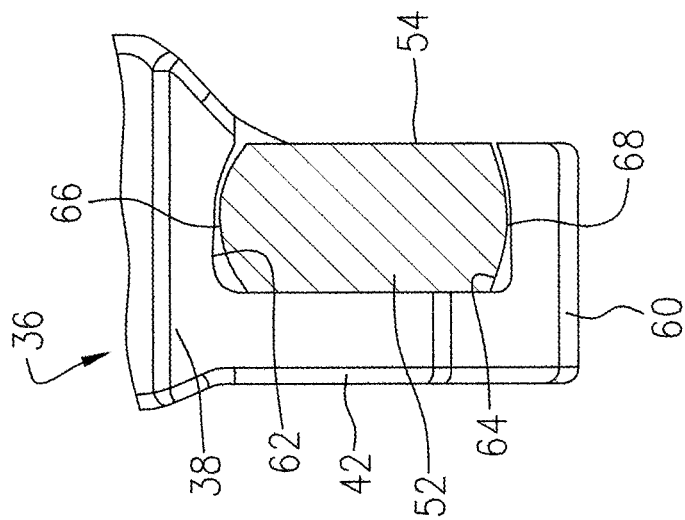
FIG. 5 is a partial and front elevational view of the connection arm according to another embodiment, connected to a stem of the VIGVs of FIG. 1.

According to a further embodiment, the connection arm 36 may further include a back flange 70 affixed to and extending radially and inwardly from the base 38 with respect to the central axis 11 of the engine 10. The back flange 70 may be disposed substantially normal to the bolting flange 42 and may be joined to the bolting flange 42 at a position adjacent the unison ring 32, thereby forming an inner corner having a joint edge 72 extending substantially in a radial direction with respect to the center line 11 of the engine 10. Therefore, the bolting flange 42 and the back flange 70 in combination may provide an L-shaped configuration to allow the end section 52 of the stem 48 to be axially positioned in place by axially sliding along a side of the bolting flange 42 toward the back flange 70, as indicated by the arrow in FIG. 7. Positioning of the end section 52 of the stem 48 in place by a tangential/circumferential movement towards the bolting flange 42 is prohibited (as indicated by the crossed arrow in FIG. 6) due to the interlock function provided by the curved profile of the respective connection arm 36 and the end section 52, as shown in FIG. 5.

The back flange 70 prevents the end section 52 of the stem 48 from over-insertion and therefore facilitates axial positioning of the stem 48 with respect to the connection arm 36 during the assembly procedure of the apparatus.

Optionally, the back flange 70 may also join with the support member 60 such that the bolting flange 42, support member 60, base 38 and the back flange 70 create a robust configuration defining a recess 74 therein with four sides of the recess 74 being closed and one side open to allow the end section 52 of the stem 48 to axially slide in and a second side open to expose the other side 54 of the end section 52 to be free of contact with any part of the connection arm 36.

Optionally, the connection arm 36 may be formed as an integral single-piece component, including the forks 40, base 38, bolting flange 42 and the support member 60, and may further include the back flange 70.

Figure 3:
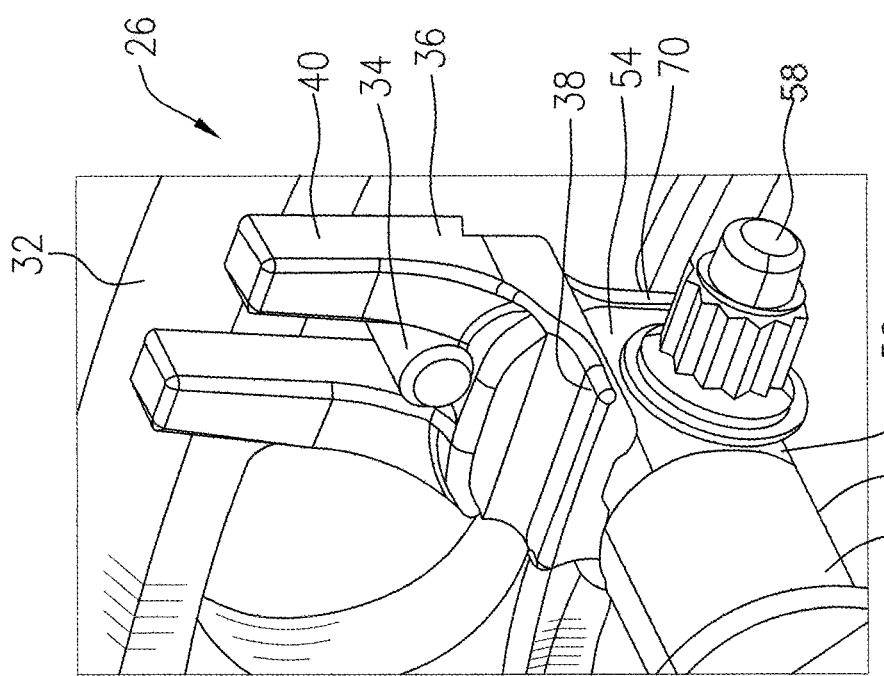
FIG. 3 is a perspective view of the apparatus of FIG. 2, showing the other side of the connection arm being open to allow a bolting nut directly resting on the stem of the VIGV.
Figure 8:
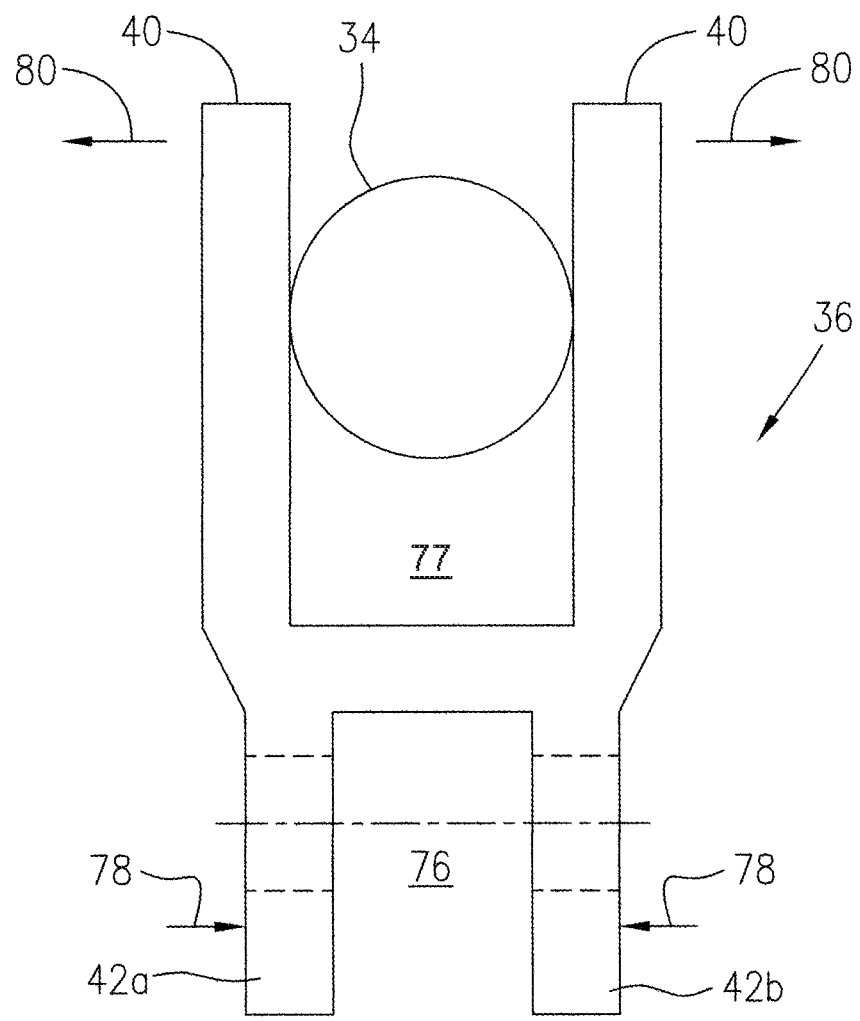
FIG. 8 is a schematic front elevational view of a connection arm according to another embodiment, showing double bolting flanges for connection with the stem of a VIGV.

Referring to FIG. 8, the connection arm 36 according to a further embodiment may have first and second bolting flanges 42a and 42b to define a slot 76 therebetween in order to receive the end section 52 of the stem 48 (see FIGS. 3 and 5). A bolt/nut assembly (not shown) which fastens the end section 52 of the stem 48 between the first and second bolting flanges 42a, 42b, applies a clamping action on the two bolting flanges 42a, 42b to urge the two bolting flanges 42a and 42b towards each other, as indicated by arrows 78. Due to the machining tolerances of the respective end section 52 of the stem 48 and the bolting flanges 42a, 42b, the clamping action as indicated by arrows 78 may cause distortion of the connection arm 36 such that the pair of forks 40 move slightly away from each other, as indicated by arrows 80, resulting in an increased width of the slot 77 defined between the pair of forks 40. This increased width may cause a loose contact of the drive pin 34 with the pair of forks 40 and may impact the accurate adjustment of the angular orientation of the respective VIGVs 28. Therefore, machining of the stems 48 of the VIGVs 28 and the connection arms 36 may require high accuracy with very restricted tolerances.

In contrast to the embodiment illustrated in FIG. 8, the embodiments described with reference to FIGS. 2-7 have only a single bolting flange 42 and the clamping action created by the bolt/nut assembly is transferred to the opposite sides of the single bolting flange 42 which will create no distortion of the connection arm 36. Therefore, tolerance relaxation in the machining process of the arms and stems can be achieved without compromising accurate adjustment of the VIGV's angular orientation.

The above described embodiments are for application in a VGIV system. However, it should be noted that the actuating apparatus can be applicable in a variable guide vane (VGV) system which can be disposed in any location of an air duct, not limited to an inlet section thereof. It should be further noted that the actuating apparatus described above is also applicable when connected to an axial VGV system with guide vanes positioned substantially perpendicular (radially) to the central axis of the engine. In such an application, the drive pin affixed to the unison ring and the stem connected to the VGV, extend radially (perpendicular to the central axis of the engine). Therefore, the drive pin drives the arm (which is disposed axially) to rotate together with the stem about a radial rotational axis of the stem.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A variable guide vane (VGV) apparatus comprising:
 a plurality of variable guide vanes (VGVs), each vane having a rotational axis and being rotatable in an adjustable angular orientation about the rotational axis of the vane;
 a unison ring defining a central axis and including a plurality of drive pins affixed to the unison ring, the drive pins with the unison ring being adjustable in an angular orientation about the central axis;
 a plurality of arms each including a base, a pair of parallel forks extending away from the base in a first direction and a bolting flange extending away from the base in a second direction opposite to the first direction, the pair of forks defining a slot therebetween, one of said drive pins being slidably received in the slot, the bolting flange defining a hole extending therethrough;
 a plurality of stems connected to the respective VGVs and rotatable about the rotational axis of the respective vanes, each stem having an end section defining parallel side surfaces facing away from each other, each stem defining a hole extending from one side surface to the other side surface; and
 a plurality of bolts moveably securing the stems to the respective arms, each bolt extending in a tangential direction with respect to the central axis through the hole of one of the bolting flanges and through the hole of one of the stems, wherein one of the side surface of each stem is in contact with the bolting flange of a corresponding arm while the other side surface of each stem is free of contact with said corresponding arm.

2. The apparatus as defined in claim 1 further comprising a plurality of nuts securing the bolts to the arms and the stems, respectively.

3. The apparatus as defined in claim 1 wherein the drive pins and the stems extend axially with respect to the central axis.

4. The apparatus as defined in claim 3 wherein the rotational axis of the respective vanes is parallel to the central axis of the unison ring.

5. The apparatus as defined in claim 3 wherein the end section of the respective stems comprises a radially-outer surface and a radially-inner surface with respect to the central axis, the radially-outer and radially-inner surfaces being at least partially in contact with the respective arms.

6. The apparatus as defined in claim 5 wherein the radially-outer and radially-inner surfaces of the end section of the respective stems comprise a curved profile.

7. The apparatus as defined in claim 1 wherein each of the arms further comprises a support member affixed to the bolting flange and spaced apart from the base, the support member and the base in combination retaining the end section of a corresponding stem therebetween during a stem assembly procedure.

8. The apparatus as defined in claim 7 wherein the base and support member of each of the arms comprise curved surfaces facing each other, respective said curved surfaces being at least partially in contact with the end section of a corresponding stem.

9. The apparatus as defined in claim 7 wherein each of the arms including at least the forks, base, bolting flange and support member is an integral single-piece component.

10. The apparatus as defined in claim 1 wherein each of the arms further comprises a back flange extending away from the base in the second direction and being disposed substantially normal to the bolting flange.

11. The apparatus as defined in claim 10 wherein the back flange and bolting flange of each of the arms are joined one with another.

12. A gas turbine engine comprising:
a compressor section;
a combustion section;
a turbine section; and
a variable guide vane (VGV) apparatus mounted to the compressor section and having a plurality of variable guide vanes (VGVs), each vane having a rotational axis and being rotatable about the rotational axis, the apparatus further including:
a unison ring disposed around an engine central axis and including a plurality of drive pins affixed to a side of the unison ring and extending axially with respect to the central axis, the unison ring being adjustable in a circumferential direction with respect to the central axis;
a plurality of arms each including a base, a pair of parallel forks extending radially outwardly from the base and a bolting flange extending radially and inwardly with respect to the central axis, the forks defining a slot therebetween, one of said axial drive pins being slidably received in the slot, the bolting flange defining a hole extending therethrough;
a plurality of stems connected to the respective VGVs and supported in the engine to be rotatable about the respective rotational axes of the VGVs, each stem having an end section defining parallel side surfaces facing away one from the other, and each stem defining a hole extending from one side surface to the other side surface; and a plurality of bolts moveably securing the stems to the respective arms, each bolt extending in a tangential direction with respect to the central axis through the hole of one of the bolting flanges and through the hole of one of the stems, wherein one of the side surface of each stem is in contact with the bolting flange of a corresponding arm while the other side surface of each stem is free of contact with said corresponding arm.

13. The gas turbine engine as defined in claim 12 wherein the rotational axis of each vane is parallel to the central axis.

14. The gas turbine engine as defined in claim 12 wherein each of the stems comprises a cylindrical section rotatably supported within the engine to define the rotational axis one of the VGVs.

15. The gas turbine engine as defined in claim 12 wherein the VGVs are disposed within a radial inlet of an airflow duct in the compressor section for directing an airflow radially into the compressor section.

16. A variable guide vane (VGV) apparatus comprising:
a plurality of variable guide vanes (VGVs), each vane having a rotational axis and being rotatable in an adjustable angular orientation about the rotational axis of the vane;
a unison ring defining a central axis and including a plurality of drive pins affixed to the unison ring, the drive pins with the unison ring being adjustable in an angular orientation about the central axis, the drive pins extending axially with respect to the central axis;
a plurality of arms each including a base, a pair of parallel forks extending away from the base in a first direction and a bolting flange extending away from the base in a second direction opposite to the first direction, the pair of forks defining a slot therebetween, one of said drive pins being slidably received in the slot, the bolting flange defining a hole extending therethrough;
a plurality of stems connected to the respective VGVs and rotatable about the rotational axis of the respective vanes, each stem having an end section defining parallel side surfaces facing away from each other, each stem defining a hole extending from one side surface to the other side surface, the stems extending axially with respect to the central axis; and
a plurality of bolts moveably securing the stems to the respective arms, each bolt extending in a tangential direction with respect to the central axis through the hole of one of the bolting flanges and through the hole of one of the stems, wherein one of the side surface of each stem is in contact with the bolting flange of a corresponding arm while the other side surface of each stem is free of contact with said corresponding arm;
wherein the end section of the respective stems comprises a radially-outer surface and a radially-inner surface with respect to the central axis, the radially-outer and radially-inner surfaces being at least partially in contact with the respective arms, the radially-outer and radially-inner surfaces comprising a curved profile.

* * * * *